July 27, 1943.    W. P. SIMPSON ET AL    2,325,432
CONTROL SYSTEM
Filed July 21, 1942    2 Sheets-Sheet 1
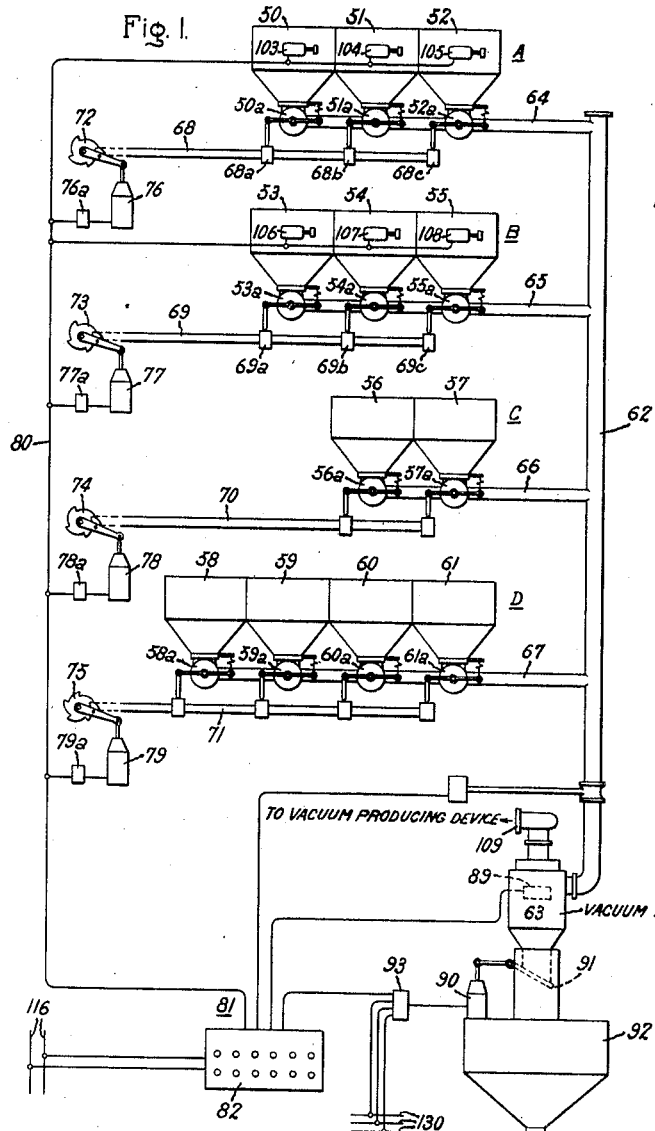
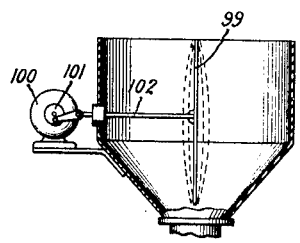
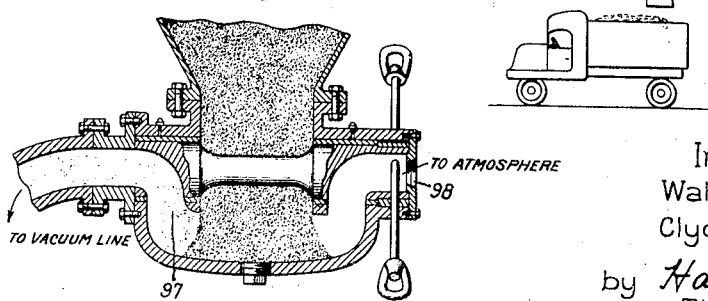
Inventors:
Waldo P. Simpson,
Clyde E. Stewart,
by Harry E. Dunham
Their Attorney.

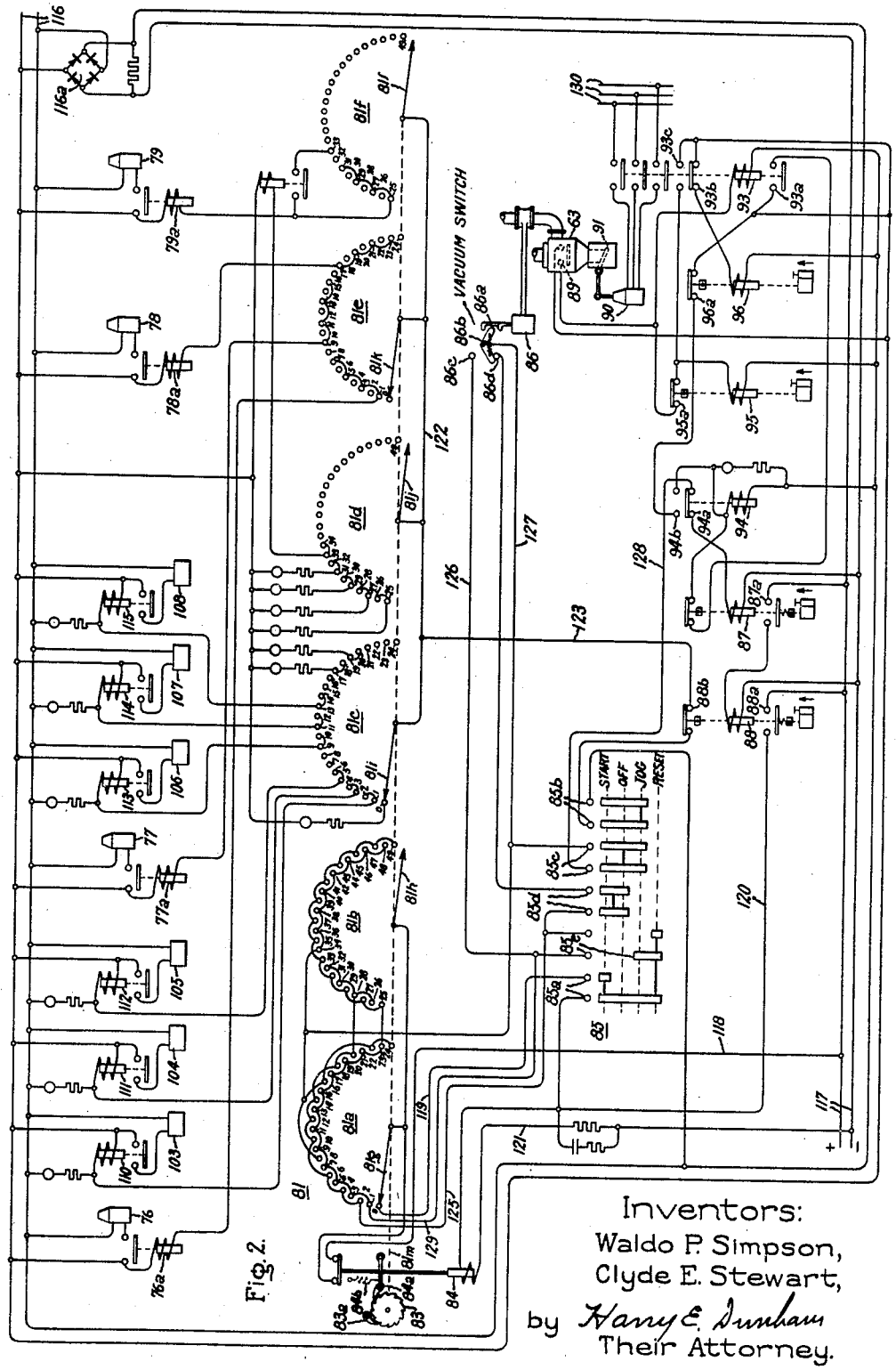

Patented July 27, 1943

2,325,432

UNITED STATES PATENT OFFICE 2,325,432

CONTROL SYSTEM

Waldo P. Simpson, Lansdowne, and Clyde E. Stewart, Upper Darby, Pa., assignors to General Electric Company, a corporation of New York Application July 21, 1942, Serial No. 451,791

6 Claims. (Cl. 302—27)

This invention relates to control systems, more particularly to systems for controlling material handling apparatus such for example as ash, siftings, and dust disposal systems, and it has for an object the provision of a simple, reliable, and improved control system of this character.

Still more particularly, the invention relates to material handling apparatus in which the material is first collected in hoppers from which the material is removed by vacuum and collected in a main bin. These hoppers are provided with valves leading to a vacuum line, and a more specific object of the invention is the provision of a control system for sequentially opening and closing these valves.

In carrying the invention into effect in one form thereof, a suitable operating mechanism is provided for the valves of a plurality of hoppers, and a selector switching device is provided for controlling the valve operating mechanism, and this selector switching device is in turn controlled by a pressure operated switch in the vacuum line which responds to changes in the atmospheric pressure in the line, which are produced by the opening or closing of preceding valves in the sequence of operation. Each of the valves is provided with ports leading to the vacuum line and to atmosphere. When the ports are opened, the differential pressure across the valve removes the material from the valve body as it piles in from the hopper until the hopper is empty. An empty hopper produces a loss of vacuum in the line when the valve is open. Vacuum returns to the system when the valve is closed. These changes in pressure in the line are utilized to control the sequential opening and closing of the valves to provide for removal of the material from the hoppers to the main bin.

As an additional feature, means are provided for interrupting the sequential operation of the valves when the main bin is being emptied.

For a better and more complete understanding of the invention, reference should now be had to the following specification and to the accompanying drawings in which Fig. 1 is a simple, diagrammatical illustration of an ash disposal system for a plurality of groups of hoppers; Fig. 2 is a simple, diagrammatical illustration of an embodiment of the invention in a control system for the apparatus of Fig. 1; Fig. 3 is a view in section of a valve for connecting a hopper to the vacuum line; and Fig. 4 is a simple, diagrammatical illustration of a vibrator unit for agitating the material in a hopper to faciiltate removal therefrom when the valve is open.

Referring now to the drawings, a material such as dust, siftings, or ash is precipitated, by suitable precipitating means into collecting hoppers 50 to 61, inclusive, which are suitably located and arranged in groups A, B, C, and D, as indicated in Fig. 1. When the hoppers are full, the material is removed from the hoppers by vacuum through the main vacuum line 62 and collected in a main bin comprising a vacuum tank 63. As shown, the hoppers 50 to 61, inclusive, are provided respectively with valves 50a to 61a, inclusive, which feed into branch ash collecting lines 64, 65, 66, and 67 which in turn feed into the main collecting line 62.

The valves of the groups A, B, C, and D are operated by cam shafts 68, 69, 70, and 71, respectively, i. e., the valves of each group are operated one at a time by cam operation from a common shaft. In this connection, the cam shaft 68 is provided with a plurality of cams 68a, 68b, and 68c which are designed and mounted on the cam shaft 68 in such a manner as to effect sequential opening and closing of the valves of the group A in response to rotation of the cam shaft 68. Similarly, the cam shafts 69, 70, and 71 are provided with cams for operating the valves in the groups B, C, and D.

The shafts 68, 69, 70, and 71 are operated by ratchet and pawl mechanisms 72, 73, 74, and 75 upon successive movements of the pawls which, in turn, are operated by any suitable means, such for example, as the electrohydraulic operating devices 76, 77, 78, and 79. Each of these electrohydraulic operating devices comprises a piston immersed within a cylinder containing oil or other suitable fluid and connected by means of connecting rods to the pawls of the pawl and ratchet mechanisms 72, 73, 74, and 75. Each of these hydraulic operating devices also has an impeller within the cylinder driven by an electric motor for producing a liquid pressure against the piston of sufficient magnitude to actuate the pawl to rotate the cam shaft.

The motors which drive the impellers of the hydraulic operating devices are controlled by relays 76a, 77a, 78a, and 79a, which are connected through a multiconductor cable 80 to a multiposition selector switch 81 which is mounted upon a control panel 82.

Instead of the hydraulic operating devices 76, 77, 78, and 79, any other suitable operating devices may be employed for rotating the cam shafts and such operating devices may be controlled by the relays 76a, 77a, 78a, and 79a under the control of the multiposition selector switch 81.

The selector switch 81 comprises six semicircular rows or banks 81a, 81b, 81c, 81d, 81e, and 81f of twenty-five contacts each, and six parallel but electrically separate wipers 81g, 81h, 81i, 81j, 81k, and 81L on a shaft 81m with a ratchet wheel 83. The shaft 81m of the selector switch is actuated step by step by means of the ratchet wheel 83 and a notching relay 84 which is provided with a pawl 84a that engages the ratchet wheel 83.

The operating coil of the notching relay 84 is under the control of a manually operated master switching device 85 and is also under the control of a vacuum relay 86 which is preferably a pressure responsive diaphragm type relay provided with a movable member 86a which actuates a snap action toggle contact mechanism 86b in response to movement of the diaphragm. A timing relay 87 and an auxiliary timing relay 88 controlled thereby are provided for controlling the sequential operations of the selector switch 81.

A switching device 89 is mounted in the main collecting bin or vacuum tank 63. This switching device is provided with a pair of normally open contacts which are closed in response to a predetermined level or weight of material in the main bin 63 to control the gate operating mechanism 90 which opens the gate 91 to empty the bin 63 into the loading hopper 92. The gate operating mechanism 90 is preferably in the form of an electrohydraulic operating device which is identical with the hydraulic operating devices 76, 77, 78, and 79 described in the foregoing. The hydraulic operating device 90 is under the control of a suitable switching device illustrated as an electromagnetic contactor 93, the operating coil of which in turn is controlled by the contacts of the main bin switching device 89.

A special control relay 94 which is controlled by auxiliary contacts 93a of contactor 93 serves to interrupt the sequencing operation of the system while the gate 91 is open and the main bin 63 is being dumped into the loading hopper 92.

For the purpose of maintaining the gate 91 open for the interval of time usually required for the main bin 63 to dump, a time delay relay 95 is provided, the time opening contacts 95a of which control the energizing circuit of contactor 93.

An additional time delay relay 96 which has a time delay in the opening of its contacts 96a equal to or greater than the time required for vacuum to return to the system after the gate 91 has been closed, is provided for controlling the relay 94 in such a manner as to prevent the resumption of the sequencing operation of the system until vacuum has returned to the system.

The construction of the valves 50a to 61a, inclusive, which are attached to the bottoms of the pockets of the hoppers 50 to 61, inclusive, is illustrated in Fig. 3. As indicated, the valve is provided with a discharge port 97 and an air inlet port 98. The discharge port 97 is connected to a branch vacuum line which in turn is connected to the main vacuum line 62. When the valve is closed, both ports are sealed and the infiltration of air through the valve to the dust pocket is prevented. When a hopper is to be emptied, the air inlet and outlet ports of its associated valve are opened. Air enters the open inlet port and is pulled around and over the pile of material in the valve so as to carry the material, which piles from the hopper into the bottom of the valve body, through the discharge port into the vacuum line.

For the purpose of facilitating removal of the material from the hoppers, certain or all of the hoppers may be provided with motor driven vibrating devices for agitating the material when the valves are open. As illustrated in Fig. 4, each of these vibrating devices comprises a separator made of a suitable material such as sheet metal and flexibly mounted in the hopper. This separator is reciprocated through a suitable amplitude of movement by means of an electric motor 100 and an eccentric 101 driven by the motor 100 and to which the separator is connected by means of a connecting rod 102. In Fig. 1, only the hoppers 50 to 55, inclusive, are illustrated as being provided with vibrators. If desired, however, hoppers 56 to 61, inclusive, also may be provided with vibrators. The motors 103, 104, 105, 106, 107, and 108 of the vibrators for the hoppers 50 to 55, inclusive, are respectively controlled by means of relays 110 to 115, inclusive, which in turn are controlled by the multi-position selector switch 81.

Vacuum of the desired magnitude may be produced in the vacuum tank 63 and the vacuum line 62 leading thereto by any suitable means. Preferably, this vacuum producing unit will comprise a ring of water nozzles fed from a circular header and discharging into a Venturi throat the entrance to which is connected through a coupling 109 to the vacuum tank 63. Power for operating the electrohydraulic operating devices, the vibrator motors, and their controlling contactors, is derived from a suitable source of alternating voltage represented by the two supply lines 116. Direct current control power for the operation of the sequencing and timing relays and the notching magnet of the selector switch 81 is derived from the source 116 through a suitable full wave rectifying device 116a.

With the foregoing understanding of the elements and their organization in the complete control system, the operation of the system will readily be understood from the following detailed description: Assuming that the hoppers are full and that it is desired to empty the hoppers, the master control switch 85 is moved to the "start" position in which it completes an energizing circuit for the operating coil of the notching relay 84. This circuit is traced from the upper or positive side of the control power bus 117 through conductor 118, normally closed contacts of notching relay 84, and thence through the wiper 81g which stands on the zero position contact of the first bank of stationary contacts of the selector switch 81, and thence through conductor 119, the closed contacts 85a of the master switch 85, conductor 120, through the operating coil of notching relay 84 and thence by conductor 121 to the negative side of the control power bus 117. In response to energization, the operating coil of the notching relay 84 draws the core of the relay downward and thereby causes the pawl 84a to engage the next tooth of the ratchet wheel 83. Ratchet wheel 83 is held by means of latch 83a. The downward movement of the armature opens the normally closed contacts of the notching relay, thereby interrupting the energizing circuit for the operating coil. The armature is returned to its unattracted position by means of the spring 84b and thereby causes pawl 84a to notch ratchet wheel 83 one step.

As a result of the actuation of the ratchet wheel 83 by the notching relay 84, the wipers 81g, 81h, 81*i*, 81*j*, 81*k*, and 81L are advanced one position and wipers 81*g*, 81*i*, 81*k* engage contact 1 of their respective banks. In this position, an energizing circuit is completed for the operating coil of contactor 76*a*. This circuit extends from the upper side of the supply source 116 through the operating coil of contactor 76*a* to contact 1 on bank 81*e* of the selector switch, thence by conductors 122 and 123, normally closed interlock contacts 88*b* of relay 88, contacts 85*b* of master switch 85 to the lower side of source 116. In response to energization, contactor 76*a* closes its contacts to connect the impeller driving motor of the electrohydraulic operating device 76 to the source 116. As a result of its energization, the electrohydraulic operating device 76 notches the ratchet wheel 72 one step thereby to cause the cam 68*a* to open the valve 50*a* to connect the hopper 50 to the branch vacuum line 64. Simultaneously, the operating coil for relay 110 is energized over a circuit extending from the upper supply line 116 through the operating coil of relay 110 to the first stationary contact on bank 81*c* of the selector switch, then by the circuit previously traced to the lower supply line 116. Relay 110 responds to energization and closes its contacts to connect the motor 103 of the vibrator for hopper 50 to the supply source 116 and as a result, the vibrator is set in motion to agitate the material within the hopper and thereby facilitate its movement through the valve 50*a* to the vacuum line.

If the amount of vacuum in the system is sufficient when the selector switch steps to position 1, the movable contact 86*b* of the pressure switch 86 is in engagement with the stationary contact 86*c* thereby completing a circuit for the operating coil of time delay relay 87 which extends from the positive side of the control supply source 117 through conductor 118 and normally closed contacts of the notching relay 84 through wiper 81*g* and contact 1 on the first bank of the selector switch, and thence by conductors 129 and 126 through contacts 86*c* and 86*b* of the vacuum switch, thence by conductor 127, contacts 85*c* of the master switch, conductor 128, normally closed contact 94*a* of relay 94, and operating coil of time delay relay 87 to the negative side of source 117. In response to energization, relay 87 closes its normally open contacts 87*a* to connect the operating coil of the auxiliary time delay relay 88 to the source 117. After a predetermined interval of time, relay 88 closes its normally open contacts 88*a* to connect the operating coil of the notching relay 84 across the supply source 117. The normally closed contact of notching relay 84 opens and interrupts the coil circuit of time delay relay 87 which returns to its original position. The normally open contacts of relay 87 deenergize relay 88. The normally open contacts of relay 88 deenergize notching relay 84 thereby allowing pawl 84*a* to advance the wipers to position 2. Wiper 81*k* in moving off the position 1 contact of bank 81*e* interrupts the energizing circuit for the operating coil of contactor 76*a*. In response to deenergization, contactor 76*a* drops out and disconnects the electrohydraulic operating device 76 from the source 116, and the latter in returning to its initial position, moves its pawl to the next position on the ratchet wheel 72.

As soon as hopper 1 is empty, the selector switch 81 steps to position 3, as a result of the loss of vacuum in the main line produced by the empty hopper. In response to the loss of vacuum in the main line, vacuum switch 86 snaps the movable contact member 86*b* from stationary contact 86*c* to stationary contact 86*d* to complete an energizing circuit for the operating coil of notching relay 84. This circuit extends from the positive side of the source 117 through the normally closed contacts of notching relay 84, wiper 81*g*, and contact 2 on the first bank of the selector switch, thence by conductor 125 and contacts 85*d* of the master switch, contacts 86*d* and 86*b* of the vacuum switch, conductor 127, and contacts 85*c* of the master switch, conductor 128, contact 94*a*, and operating coil of time delay relay 87 to the negative side of supply source 117. As a result, relays 87 and 88 pick up and connect the operating coil of notching relay 84 to the source 117 in the manner described in the foregoing. As before, the notching relay 84 advances the ratchet wheel 83 one step and moves the wipers of the selector switch from position 2 to position 3, and as before, relays 87, 88 and notching relay 84 are restored to their original positions.

On reaching position 3, contactor 76*a* is again energized over the circuit previously traced except that it passes through stationary contact 3 instead of stationary contact 1 on bank 81*e* of the selector switch. The electrohydraulic operating device 76 is again energized and the cam shaft 68 is notched one step to close the valve 50*a* and open the valve 51*a* of hopper 51.

Before the selector switch can advance to point 4, vacuum must return to the system, and this should occur within a brief interval following the closing of valve 50*a*. The sequence described in the foregoing continues until all the valves of group A have been opened and closed.

When the selector switch steps to point 9, contactor 77*a* is energized and closed to connect the motor of electrohydraulic operating device 77 to the supply source 116. In response to energization, the electrohydraulic operating device 77 notches the ratchet wheel 73 one step and actuates the cam shaft 69 to open the valve 53*a* of hopper 53 of group B.

This sequential operation continues until the wipers of the selector switch reach the zero position at which point the notching operation of the selector switch is discontinued owing to the open circuit on the zero position of the first bank 81*a*.

As previously pointed out, the control system is so interlocked that when the main collector bin 63 is being dumped, the sequencing operation of the control system will be interrupted in order to prevent the skipping of a hopper as a result of operation of the vacuum switch 86 in response to a loss of vacuum in the main line by the opening of the gate 91. When the material which is being collected in the main collecting bin 63 reaches a predetermined level, the contacts of switching device 89 are closed to connect the operating coil of contactor 93 to the source 116. Responsively to energization, contactor 93 closes its three upper main contacts to connect the driving motor of the electrohydraulic operating mechanism 99 to the supply source 130 and simultaneously opens its normally closed contacts 93*b* and closes its normally open contacts 93*a* and 93*c*. As the material flows from the main bin 63 into the loading bin 92, the level of the material in bin 63 will drop and allow the contacts 89 to open. However, the operating coil of the contactor 93 is maintained energized through the time delay opening contacts 95*a* of time delay relay 95 and the contacts 93*c* which together provide a circuit in parallel with the contacts 89.

The opening of contacts 93*b* interrupts the energizing circuit for the operating coil of time delay relay 96 which closes its contacts 96a without time delay. Contacts 96a in closing complete an energizing circuit for the operating coil of relay 94. This circuit is traced from the lower side of the source 116 through operating coil of relay 94, normally closed upper interlock contacts of relay 87, contacts 93a of contactor 93 to the upper side of the source 116. In response to energization, relay 94 opens its normally closed contacts 94a in the circuit of the operating coil of time delay relay 87 and thereby interrupts the sequencing operation of the system, and closes its normally open contacts 94b to complete a sealing-in circuit through the contacts 96a of time delay relay 96.

The closing of contacts 93c completed an energizing circuit for the operating coil of time delay relay 95. As indicated on the drawings, this relay has time opening contacts 95a and the timing of the relay is such that contacts 95a do not open until the normal time for the dumping of the bin 63 has expired. At the expiration of this interval of time, the contacts 95a open to interrupt the sealing circuit for the operating coil of contactor 93 which in response to deenergization opens its three upper main contacts and its auxiliary normally open contacts 93c and closes its normally closed auxiliary contacts 93b. As a result of this operation, the electrohydraulic operating mechanism 90 is disconnected from the source 130, thereby deenergizing the electrohydraulic operating device and closing the gate 91. The closing of contacts 93b connects the operating coil of time delay relay 96 to the source 116. Following the closing of gate 91, vacuum begins to return to the system and after an interval of time sufficient for vacuum to return to the system under normal operating conditions, the relay 96 opens its contacts 96a to interrupt the sealing-in circuit for the operating coil of relay 94. As a result of its deenergization, relay 94 drops out and closes its normally closed contacts 94a in the energizing circuit for the operating coil of the time delay relay 87 thereby to provide for resumption of the sequencing operation of the system.

If the wiper 81g on bank 81a of the selector switch steps to one of the odd numbered positions of the bank on which presence of vacuum in the system is required to cause the selector switch to step to the next point, there is a possibility that the selector switch will stop on this position if the hopper which corresponds to this particular position is empty, since vacuum cannot be built up in a system with the valve open to an empty hopper. For the purpose of providing means for continuing the sequential operation under such conditions, an additional pair of normally open contacts 85e in the master switch is connected between the odd numbered stationary contacts of the first bank and the operating coil of the notching relay 84. Thus, if the wiper 81 steps to an odd numbered position, the corresponding hopper of which is empty, vacuum cannot be built up in the system and the sequential operation will stop. Consequently, the movable contact member 85b of the vacuum switch will remain in contact with the stationary contact 85d. To continue the sequential operation of the system, the contact 85e may be closed as by moving the master switch to the position in which these contacts are closed, thereby completing the energizing circuit for the operating coil of notching relay 84 from the positive side of the supply source 117 through the normally closed contacts of the notching relay, wiper 81g to any of the odd numbered stationary contacts, and thence by conductor 129 to and through contacts 85e, conductor 128, operating coil of notching relay 84 and conductor 121 to the negative side of supply source 117. As a result, the notching relay 84 is energized and advances the wipers of the selector switch to the next position from which the previously described sequential operation continues in the normal manner.

Although in accordance with the provisions of the patent statutes this invention is described as embodied in concrete form and the principle thereof has been explained together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. A material handling system comprising in combination, a plurality of material containers, a common discharge conduit for said containers, means for producing subatmospheric pressures in said conduit, a separate valve for each of said containers for completing and interrupting connections from said containers to atmosphere and to said conduit, a selector switching device having a plurality of operating positions, means responsive to changes in atmospheric pressure in said conduit for successively actuating said selector switching device to said operating positions, and means responsive to operation of said switching device to said positions for successively opening and closing said valves.

2. A material handling control system comprising in combination, a plurality of material containers, a common discharge conduit for said containers, a separate valve for each of said containers for connecting said containers to said conduit and to atmosphere, means for producing subatmospheric pressures in said conduit, a selector switching device having a plurality of operating positions, a starting control device for setting said selector switching device in operaton, operating means for said valves responsive to operation of said selector switching device to said operating positions for successively opening and closing said valves, and a device cooperating with said selector switching device and responsive to a subatmospheric pressure in said conduit for actuating said selector switch to one of said operating positions and responsive to atmospheric pressure in said conduit for actuating said selector switch to a succeeding position.

3. A control system for material handling apparatus and the like having a plurality of material containers, a common discharge conduit for said containers, means for producing subatmospheric pressures in said conduit, a separate valve for each of said containers for completing and interrupting communication from said containers to atmosphere and to said conduit, a plurality of vibrator units for agitating the material in said containers, a selector switching device having an off position and a plurality of operating positions, means responsive to changes in atmospheric pressure in said conduit for successively actuating said switching device to said operating positions, and means responsive to operation of said switching device to said positions for successively opening and closing said valves and simultaneously energizing and deenergizing said vibrator units.

4. A control system for material handling apparatus and the like having a plurality of material containers, a common discharge conduit for said containers, means for producing subatmospheric pressures in said conduit, a separate valve for each of said containers for completing and interrupting communication from said containers to atmosphere and to said conduit, a material collector in said conduit provided with a discharge passage, a selector switch having an off position and a plurality of operating positions, means responsive to changes in atmospheric pressure in said conduit for successively actuating said switching device to said operating positions, means responsive to operation of said selector switch to said operating positions for sequentially opening and closing said valves, means responsive to a predetermined amount of material in said collector for opening said discharge passage, and means responsive to the opening of said discharge passage for interrupting the sequential operation of said valves.

5. A control system for material handling apparatus having a plurality of material containers, a common discharge conduit for said containers, means for producing a substantial vacuum in said conduit, a separate valve for each of said containers for completing and interrupting communication from said containers to atmosphere and to said conduit and a material collector connected in said conduit and provided with a discharge opening comprising in combination, a selector switch having an off position and a plurality of operating positions, means responsive to pressure changes in said conduit for successively actuating said selector switch to said operating positions, means responsive to operation of said selector switch to said operating positions for sequentially opening and closing said valves, means responsive to a predetermined amount of material in said collector for opening said discharge passage to empty said collector, a time element means responsive to the opening of said discharge passage for maintaining said discharge passage open for a predetermined interval of time and for closing said passage at the expiration of said time interval, means responsive to the operation of said discharge opening, means for interrupting the sequential operation of said valves, and a second time element device responsive to the operation of said first time element device for resuming the sequential operation of said valve operating means after the interval of time required for the restoration of vacuum in said conduit following the closing of said passage.

6. A control system for material handling apparatus having a plurality of material containers, a common discharge conduit for said containers, means for producing a substantial vacuum in said conduit, a separate valve for each of said containers for completing and interrupting communication from said containers to atmosphere and to said conduit and a material collector connected in said conduit and provided with a discharge opening comprising in combination, a selector switch having an off position and a plurality of operating positions, means responsive to pressure changes in said conduit for successively actuating said selector switch to said operating positions, means responsive to operation of said selector switch to said operating positions for sequentially opening and closing said valves, a switching device operable in response to a predetermined amount of material in said collector and means controlled thereby for opening said discharge passage to empty said collector and for interrupting the sequential operation of said valves, and time element means set in operation by said switching device for closing said discharge passage at the end of the time interval required to empty said collector and to resume the sequential operation of said valves at the end of a second time interval required for vacuum to return to said conduit following the closing of said discharge passage.

WALDO P. SIMPSON.
CLYDE E. STEWART.